United States Patent [19]
Bergegére

[11] 3,790,883
[45] Feb. 5, 1974

[54] PARTICLE STUDY APPARATUS HAVING IMPROVED PARTICLE RESOLUTION MEANS

[75] Inventor: Pierre Bergegére, Aignan, France

[73] Assignee: Coulter Electronics, Inc., Hialeah, Fla.

[22] Filed: May 9, 1972

[21] Appl. No.: 251,773

[52] U.S. Cl. .......................... 324/71 CP, 324/71 R
[51] Int. Cl. ........................................ G01n 27/00
[58] Field of Search ............ 324/71 R, 71 CP, 77 A; 328/114, 117

[56] References Cited
UNITED STATES PATENTS
| | | | |
|---|---|---|---|
| 3,701,029 | 10/1972 | Hogg | 324/71 CP X |
| 3,678,296 | 7/1972 | Day | 328/114 |
| 3,259,842 | 7/1966 | Coulter et al. | 324/71 CP |

OTHER PUBLICATIONS
"Slope Discriminator," IBM Technical Disclosure Bulletin, Vol. 3, No. 9 February, 1961, pg. 30.

Primary Examiner—Alfred E. Smith
Assistant Examiner—Rolf Hille
Attorney, Agent, or Firm—Silverman & Cass

[57] ABSTRACT

Electronic particle study apparatus of the Coulter type having a sensing zone arrangement wherein pulses are generated by particles in liquid suspension passing through the scanning ambit of a minute scanning aperture of said arrangement. Particle resolution means are provided which includes a low threshold level detector circuit, a high threshold level detector circuit, and a positive slope detector circuit including a differentiating circuit. The output signals from the detector circuits are fed through a logic circuit to a counter circuit so that each positive slope end of each pulse whose amplitude is between the low threshold and high threshold enables a signal in the form of a trigger pulse to be fed to the counting circuit to register a count signal representative of the passage of a particle through the scanning ambit of the scanning aperture to enable resolution or distinguishment between two particles following each other at a short time interval therebetween.

14 Claims, 5 Drawing Figures

Patented Feb. 5, 1974

Patented Feb. 5, 1974 3,790,883

PARTICLE STUDY APPARATUS HAVING IMPROVED PARTICLE RESOLUTION MEANS

FIELD OF THE INVENTION

This invention relates generally to particle study apparatus of the type wherein particles are particle through a sensing zone arrangement which includes means for generating a train of pulses representative of the passage of each particle through the scanning ambit of said sensing zone. More particularly, this invention provides means whereby pulses in said pulse train occasioned by the passage of particles through said scanning ambit at short time intervals therebetween may be distinguished so as to materially reduce the counting error which would be encountered in such occasions.

BACKGROUND OF THE INVENTION

Apparatus of the general type here involved includes apparatus wherein the physical characteristics of particles in fluid electrolyte suspension are expressed in the form of pulse particles passing through an electrical field defined in a minute scanning aperture. Examples of such apparatus are described in several United States Patents such as U.S. Pat. Nos. 2,656,508; 2,985,830; 3,259,842 and others. Well-known in the art of electronic particle counting and analyzing is apparatus marketed under the trademark "COULTER COUNTER," a registered trademark of Coulter Electronics, Inc., of Hialeah, Fla. In such structures, a minute aperture is provided in a wall of an insulated vessel, such as, for example, adjacent the bottom end of a glass test tube. The aperture is of the order of several to several hundred microns in diameter depending upon the nature of the particles being studied. A suspension of the particles is prepared in a suitable liquid electrolyte, the electrical impedance per unit volume of which is different from that of the particles and of known dilution in instances where an accurate count of the number of particles is one of the objects of study. Another insulated vessel, such as a glass beaker, is provided with a quantity of the suspension thus prepared, the aperture of the first vessel being submerged in the suspension of the second vessel. Means establishing a pressure differential between the two vessels is provided so that the suspension will pass through the aperture from the second or other vessel to the first inner vessel. Means for establishing a known rate of flow through said scanning aperture also is provided where the study is intended to count the number of particles.

An electric current flow is established between the two vessels by suspending electrodes in the respective bodies of the suspension or another energy field may be established by suitable means. The only fluid connection between the two bodies is through the scanning aperture and hence a current flow or energy field is established in the aperture. As each particle passes through the aperture, for the duration of the passage, in the case of current flow establishment, the impedance of the contents of the aperture will change, thereby modulating the current flow in the aperture, and hence causing a signal to be applied to electrical circuitry arranged to respond to such change.

It is known that the energy field established within the scanning aperture is effective both within and adjacent to the aperture and hence the effective changes therein occasioned by the passage of particles therethrough will occur in the volume closely adjacent to and within the aperture and hence reference will be made to the term "scanning ambit" of the aperture to define the volume through which passing particles cause modulation of the energy field to generate detectable pulses.

A common arrangement is to have the signal thus developed applied to the input of an amplification chain which in turn provides a pulse train which drives some form of indicating, measuring, or recording devices. As a rule, these signals appear in the form of pulses whose instantaneous amplitude is a function of the change of the scanning ambit resistance between the electrodes, for example.

Generally, pulses generated by the particles passing through the scanning ambit should be delivered as a one-pulse-per-particle passage. The pulses thus produced and counted result in an output value affording information about the physical characteristics of the phenoma studied, including the count of the number of particles passing through the scanning ambit of the scanning aperture, as well as the size, volume and other characteristics thereof.

A significantly important portion of the apparatus concerned is the characteristics of the minute scanning aperture. Single particles passing therethrough are detected at a rate often well in excess of one thousand per second. Because of the physical perameters of the scanning aperture, the particles, the rate of flow and the like, frequently there results coincidence of two particles within the scanning ambit of the scanning aperture. As a result, where there are two particles following each other within the scanning ambit of the aperture at a very short time interval, distinguishing between the two particles, that is resolution thereof, is not possible and only one particle of the two is detected and registered, as will be hereinafter described.

In U.S. Pat. No. 3,259,842, apparatus is provided wherein there is a pair of variable threshold level circuits by means of which the user may choose an amplitude level below which pulses are to be discarded and a second amplitude level above which pulses are to be discarded so that the pulses counted or analyzed occur only through the "window" defined between the two thresholds. With such thresholds, the counting circuit is rendered inoperative by a veto pulse occurring when the pulse representing the passage of a particle exceeds the upper threshold. If there is no veto signal counting circuit is energized when the trailing edge of the pulse drops below the lower threshold level.

Where two particles follow each other through the aperture at such time interval so that the corresponding pulses are partly overlapped and the output signal from the amplification chain does not drop below the low threshold between both pulses, the composite signal erroneously is sensed and counted as a signal, which represents neither of the original particles. Where the two particles simultaneously pass into and through the aperture, again only one of the two particles is counted. In fact, the peak amplitude of the pulse resulting from such phenomena would be the sum of the amplitudes of the two pulses that would have been generated if the particles had been separated sufficiently and would more than likely be above the upper threshold level and thus discarded.

Thus counting losses due to the inability to distinguish between, or in other words, to resolve the pulses generated by particles coincidently within the scanning ambit of the scanning aperture is a serious problem to which attention is directed.

SUMMARY OF THE INVENTION

In a particle study apparatus of the type wherein particles are passed through the scanning ambit of a sensing zone arrangement to produce a train of pulses representing characteristics of said particle, pulse resolution means comprising low threshold level circuit means, high threshold level circuit means and a positive slope detector means, said pair of threshold level circuits defining a window for passage of pulses having amplitude peaks between the selected levels and said positive slope detector means providing an output signal also when the slope of the leading edge of each pulse is positive. A logic circuit is provided for receiving the output signals of said threshold circuits and said positive slope detector means and provides an output signal, preferably in the form of a trigger pulse, only if and each time the amplitude of the pulse representing passage of a particle is between the high and low threshold levels and the positive slope end is present. In the embodiment described, the trigger pulse is fed to counting means to activate same whereby to register each particle passing through the scanning ambit of the sensing zone arrangement notwithstanding occasions when the pulses representing more than one particle are so close in time as to be applied one upon the other, so long as there is some detectable time interval separating the amplitude peaks thereof.

DESCRIPTION OF THE PREFERRED EMBODIMENT

Figure 1:
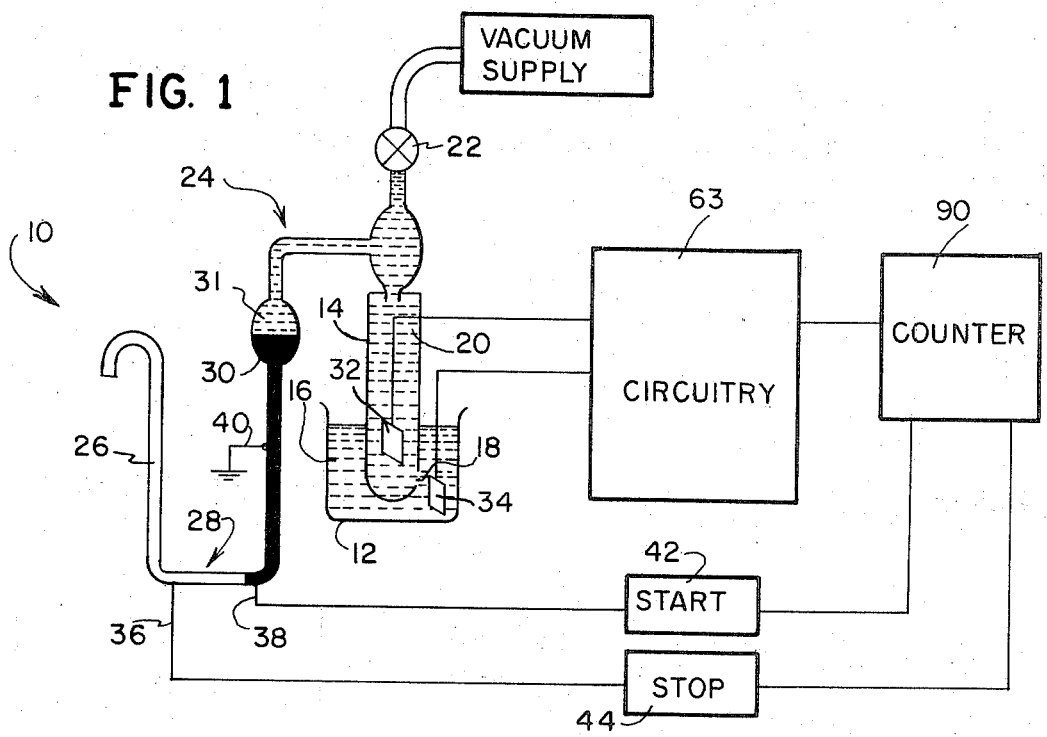
FIG. 1 is a diagrammatic representation of a particle study device of the character concerned.

Referring now to FIG. 1, the apparatus shown in simplified diagrammatic form often is referred to as the sample stand, since it usually is mounted on some form of standard which supports the same and permits the test fluid suspensions to be associated therewith. This "stand" is designated generally by reference character 10 and comprises basically a pair of vessels 12 and 14 formed of some insulating material. The inner vessel 14 is an enclosed tube, and the outer vessel 12 is a simple beaker or the like adapted to be brought up to the tube so that the bottom end of the tube is immersed in a body of fluid suspension 16 and carried in the outer vessel 12.

The outer wall of the inner tube 14 is provided with a fine aperture 18 which, in most instances, ranges from 20 to 200 microns in diameter. The interior of the tube 14 is filled with a suspension in the form of a body 20 which may or may not be the same as that of the body 16. The body 16 has suspended therein particles whose concentration, properties, or number it is desired to study. The upper end of the tube 14 is connected to a source of vacuum through a valve 22 and to a manometer-syphon structure 24.

The manometer-syphon structure 24 comprises a simple U-shaped mercury manometer arrangement having a relief capillary tube 26 open to the atmosphere, a measuring section 28 of connected capillary tubing, preferably arranged horizontally or nearly so and a vertical section 30 which connects with the upper end of the tube 14 through a reservoir 31. The fine aperture 18 may be referred to here and after as the scanning aperture and may be provided in accordance with the teachings, for example, of U.S. Pat. No. 2,985,830.

If a vacuum is applied to the fluid body 20, fluid will be sucked from the body 16 through the aperture 18. As this occurs, any particles which are suspended in the body of fluid will pass alos through the aperture 18.

The aperture 18 is the principal or only electrical and physical path existing between the two vessels 12, 14. If there is a potential applied to the electrodes 32, 34 suspended respectively in the vessels 12, 14 the only flow of current possible is through the aperture 18. The particles, which have a different conductivity than the suspension in the aperture 18, pass through the aperture and the impedance of the aperture contents changes. This change modulates the potential across the aperture 18 and produces a detectable signal.

The stand 10 provides the signals or pulses for starting and stopping the counting and sizing apparatus. The stop and start pulses are produced by means of suitable electrodes as 36 and 38 in the measuring section 28 of the manometer. There is a common or ground electrode in the capillary tubing 30 as shown at 40.

Assuming that the apparatus has been set into operation by energizing the same through suitable power sources (now shown), the mercury which is shown as the dark portion of the manometer-syphon structure is equalized in the manometer. With the vessels in the position shown, the valve 22 is opened and the vacuum supply tends to draw the body of fluid 20 through the valve 22. Since the aperture 18 provides greater resistance to passage of fluid than the open-ended manometer-syphon structure the mercury is raised in the section 30 and this is permitted to continue until the column of mercury has passed to the right of the electrode 38. The valve 22 then is closed, and the mercury column permitted to drop to equalize itself. As the column drops, it syphons fluid by displacement into the tube 14 through the aperture 18.

When the column of mercury engages the first electrode 38, it closes the circuit through itself to the electrode 38 and energizes the start circuit 42. As the mercury passes through the measuring or metering section 28, a predetermined volume of suspension is drawn through the aperture 18. When the mercury column reaches the electrode 36, the stop circuit 44 is energized. The counter only will record the number of pulses which were produced during the scanning period and which were permitted passage through the apparatus by the various control circuits which will be explained below.

When the apparatus is used for the counting of blood cells, a slightly different electrolyte is used depending on whether a count of white or red cells is desired. To count white blood cells, generally a blood solution diluted to 1/500 is used in which the red cells are destroyed. For the usual counting time of 13.6 seconds, an average of 6,000 white blood cells is counted. For counting red blood cells, lesser dilution is used generally, in the order of 1/5 and the counting during 13.6 seconds is in the order of 60,000 cells.

For the purpose of this application, reference shall be made to a sensing zone arrangement. The sensing zone arrangement as used herein shall include the scanning ambit of the minute scanning aperture relative to or through which pass and are detected single particles and wherein the energy field established therein and modulated by the passage of particles is applied such as by electrodes coupled to a current source. The sensing zone arrangement shall further include the structure commonly referred to as the "stand" as well as the amplification chain and attendant electrical circuitry producing the train of pulses representative of the modulation of said field by the passage of each particle therethrough and which feeds said pulse train to the pulse resolution means provided by the invention.

It should be understood that although the Coulter type of particle study device is described specifically herein, particle study apparatus operating with light or acoustic energy and having optical or acoustic sensing zone arrangements are encompassed by the invention herein to the extent that these other types of particle study apparatus are subject to count loss occasioned by particles passing through the sensing zone scanning ambit of those arrangements at such short time intervals therebetween so that there is a failure to resolve said particles.

Reference will now be made to the diagrammatic representations and waveshapes illustrated in FIG. 2 in order to explain the problems encountered in counting particles by the conventional instrument and the advantages obtained by use of the improvement of the invention.

Figure 2:
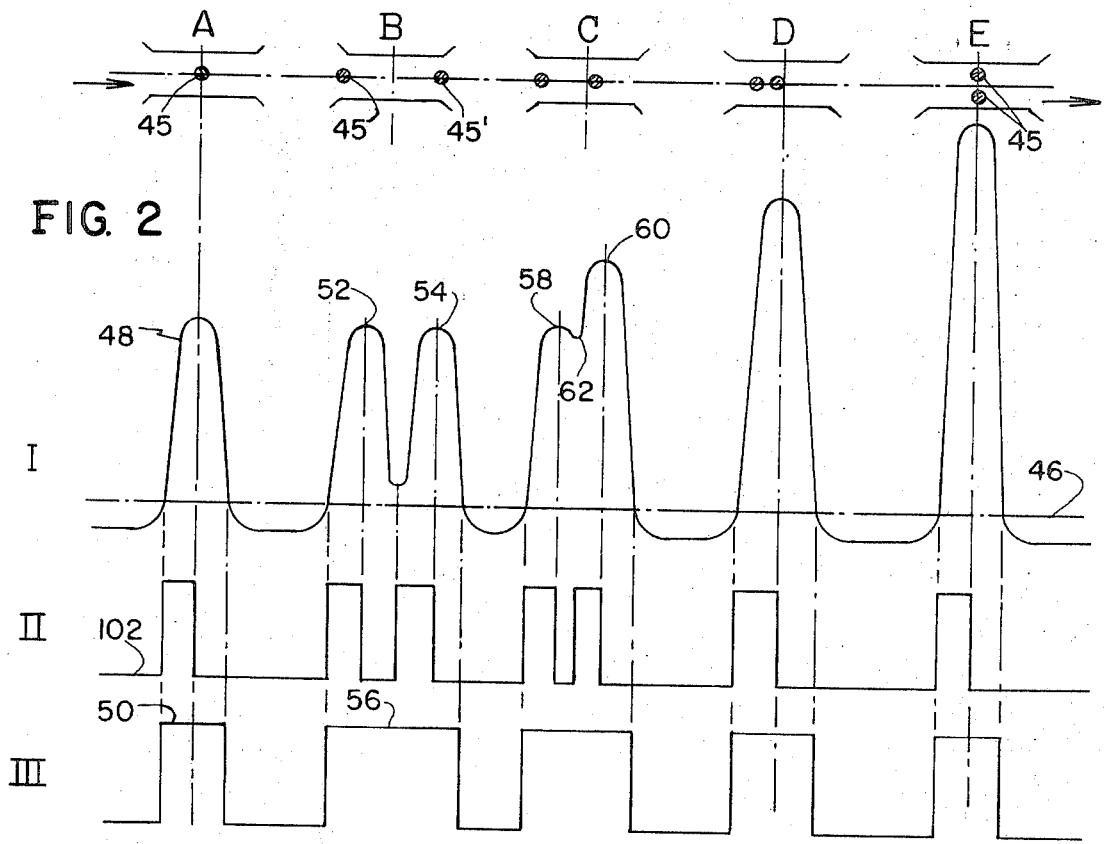
FIG. 2 is a diagrammatic representation of the signals appearing in various situations and the resulting effect thereon on the resolution of the particles responsible for these signals.

Five examples illustrating the passage of particles 45, 45' into and through the calibrated minute aperture 18 of tube 14 of the stand 10 illustrated in FIG. 1 are schematically represented in the upper portion of FIG. 2. These examples are identified by references A, B, C, D, and E respectively.

The representative waveshapes attributable to particles 45, 45' passing through aperture 18 in each example are schematically reproduced in line I of FIG. 2. In example A, only a single particle 45 passes into and through the minute aperture 18 to cause a single pulse 48 of substantially symmetrical waveshape. Detection means can be provided with a low amplitude threshold level represented by broken line 46 in FIG. 2. The low amplitude threshold level 46 is selected clearly below the corresponding maximum in the case of a particle of desirable size for study. In example A, this signal is present in the form of a rectangular pulse 50 whose width corresponds with the duration during which the output signal of the amplification chain remains above the threshold 46.

In Example B, two particles 45 and 45' follow each other through the aperture 18 with such a time interval therebetween that the corresponding pulses 52, 54 partly overlap and the amplifier output does not drop below the low threshold 46 between peaks of the pulses 52, 54. Although two particles have passed through the aperture, only one particle is detected as shown by the representation 56 in line III of FIG. 2.

In Example C, the particles 45, 45' are closer together during passage through the aperture 18 and hence the valley 62 separating both the peaks of pulses 58, 60 is shallow. Here too, only one particle is counted. In Example D, the particles 45, 45' are so close that the valley is absent altogether and only one particle is counted.

Finally, in Example E, the two particles 45, 45' pass simultaneously into and through the aperture 18 and only one is counted. The probability of these occurrences is far from being negligable because the size of the particles in general is of a lower size order than that of the diameter of the aperture. For example, it may be noted that the diameter of the white cells is between 10 and 15 microns and that of the erythrocytes between 7 and 8 microns normally, while a standard aperture has a diameter in the size order of 100 microns. The duration of a pulse generally is, in Example A, approximately 40 microseconds.

Accordingly, it is shown that in Examples B, C, D, and E, there is a counting loss which only remains tolerable if the concentration of the particles is sufficiently weak so that the Example A condition greatly predominates so that at almost all times only one particle at a time passes therethrough. However, in practice, a counting loss is noticed so frequently that correction coefficient for coincidence applied to the resulting count often exceeds 20 percent.

In accordance with the invention, not only the periods during which the output signal of the amplifier is higher than the threshold 46, but also periods during which the signal grows in amplitude are detected, that is, during which the slope of the signal is positive. There is a differentiation of the leading edge of the signal from the low threshold level to its peak. In the examples illustrated in FIG. 2, the positive slope detector means provided provides an output signal which is represented by the rectangular waveshape represented in line II of FIG. 2. If the counter 90 signal is activated at occasions when the positive slope detector signal is terminated and the output signal exceeds the low threshold, it is shown that the counting becomes more correct, since, the particles have been resolved or distinguished therebetween in Examples B and C, even though Examples D and E do not achieve such resolution.

Figure 3:
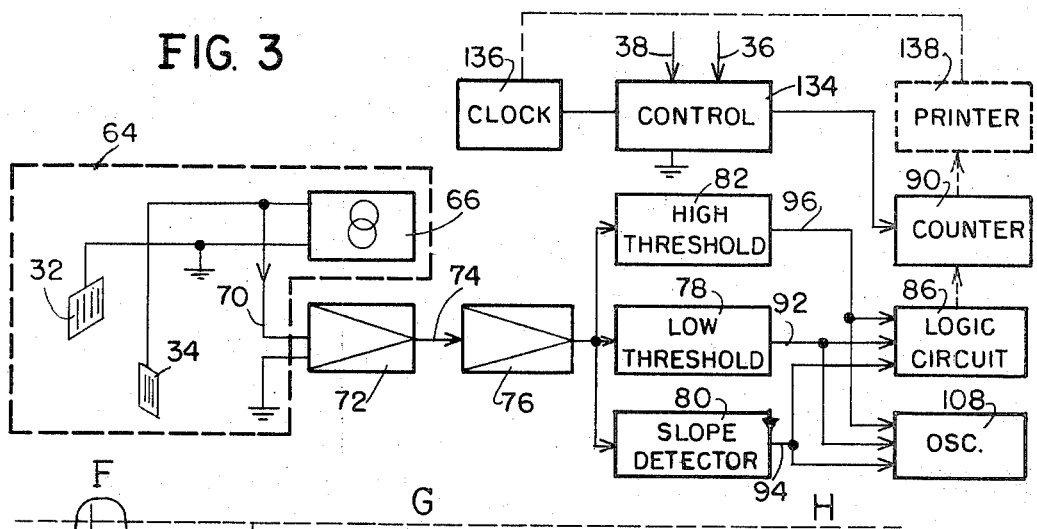
FIG. 3 is a block diagram of the amplification and counting portions of a particles study device constructed in accordance with the invention.

Referring now to the circuit in block form schematized in FIG. 3, actually representing electrical circuitry (63 in FIG. 1), the pulse generator for the apparatus is laid out within broken line block 64 and effectively represents the stand 10 supplied by a D.C. generator 66 which causes a current flow of a certain value in the circuit including the two electrodes 32 and 34, the value of the current being selected, bearing in mind the maximum current density in the aperture 18 and the polarization of the electrodes 32 and 34. The use of a D.C. generator offers certain advantages over the use of a constant voltage source which includes a high resistance that can create considerable noise at the input to the amplification chain.

The voltage drop between the electrodes 32, 34 due to the impedance in the aperture substantially is applied at the input 70 of a voltage preamplifier 72, the output 74 of which feeds an adjustable gain amplifier 76. Moreover, the gain of the amplifier 76 must be selectable so that the low threshold level is attainable by selecting, for the particles of smaller diameter to be detected, the maximum gain which would not be highly excessive for large size particles. Practically, six gain increments suffice in general, with each two successive increments being in a ratio equal to two.

The amplifier 76 is coupled in series in FIG. 3 with a low threshold level detector circuit 78 and in series with a positive slope detector circuit 80 which includes a differentiator circuit. High threshold level detector circuit 82 also is provided coupled to the amplifier 76 so as to be parallel with both the low threshold level circuit 78 and the positive slope detector circuit 80. The high threshold detector circuit 82 is adjustable so as to permit selecting a measurement window and its spacing to accommodate pulses corresponding to particles of large diameter within the amplitude window in question as determined by the threshold level detector circuits 78 and 82. The low and high threshold levels are represented by broken lines 46 and 84 respectively in FIG. 4. The two threshold level circuits 78 and 82 and the slope detector circuit 80 are coupled to a logic circuit 86. The logic circuit or logic block means 86 furnishes an output in the form of a trigger pulse, represented by 88 of FIG. 4, to an electronic counter 90 for each positive slope end located between the low and high threshold levels 46 and 84. In the embodiment described here, circuit 86 may be described as a veto AND gate.

Figure 4:
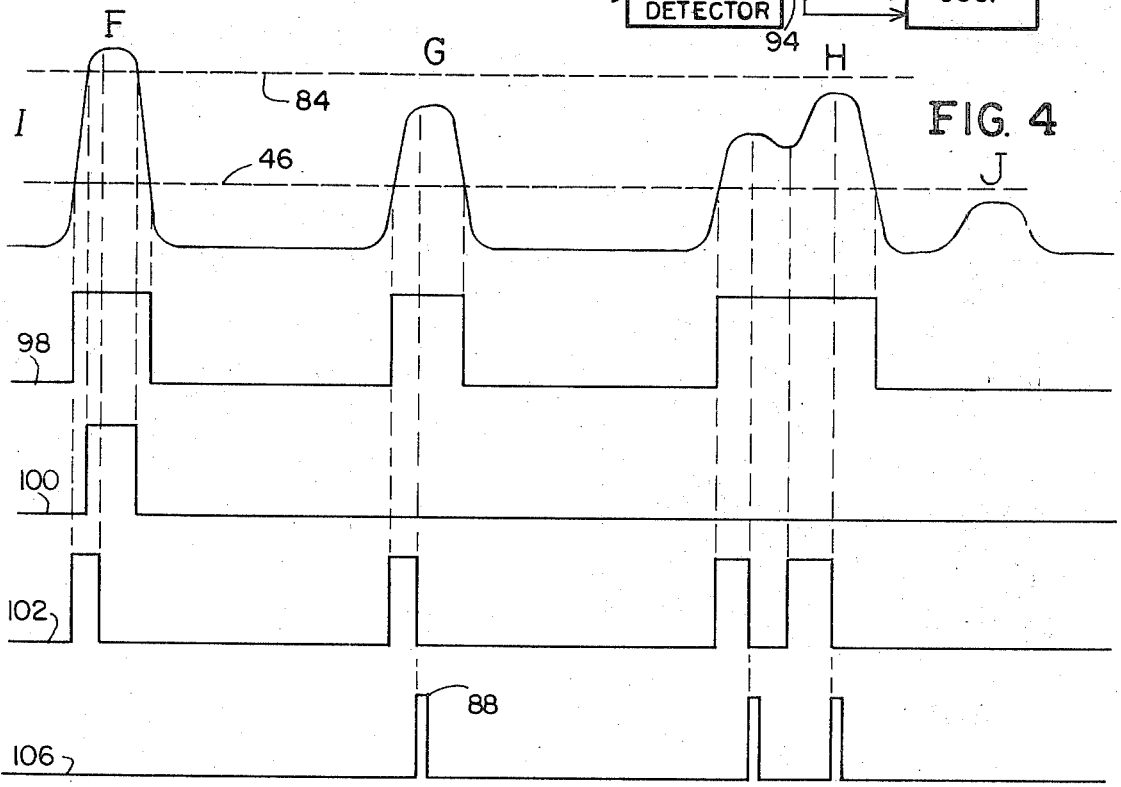
FIG. 4 is a diagrammatic representation of the pulses appearing in the amplification and counting portions illustrated in FIG. 3 in several typical occurrences.

In FIG. 4, waveshapes are diagrammatically illustrated which are representative of the signals appearing in four typical examples, designated by letters F, G, H, and J. The upper line I of FIG. 4 shows four pulses respectively corresponding to the passage (F) of a particle having an amplitude above the range of amplitude to be counted, (G) of a particle to be counted, (H) of two particles succeeding one after the other with a short distance therebetween in passage through the aperture and (J) a particle with an amplitude below the amplitude range defined by the measuring window or between the high and low threshold levels which are shown respectively by parallel broken lines 84, 46 respectively. The low threshold level detector means 78, the high threshold level detector means 82 and the positive slope detector means 80 then furnish at their respective outputs 92, 96 and 94, output signals identified by waves 98, 100 and 102 respectively in FIG. 4.

The output 106 of the logic circuit 86 is directed to the counter 90 in the form of short release or trigger pulses 88 corresponding to the coincidence of the end of a signal 102 with the presence of a signal 98 and the absence of a signal 100. Looking at line 106, representing the trigger pulse output of logic circuit 86 it is seen that no pulse is supplied in cases F and J, which indeed are to be discarded. The particle of case G and both particles of case H are actually resolved and counted, although the trailing edge of the first pulse of case H does not return below the low threshold level 46 and the valley between the two pulses of H does not so return. An oscilloscope 108 enables the operator to visualize the signals concerned and to facilitate the adjustment of the window, for example.

Figure 5:
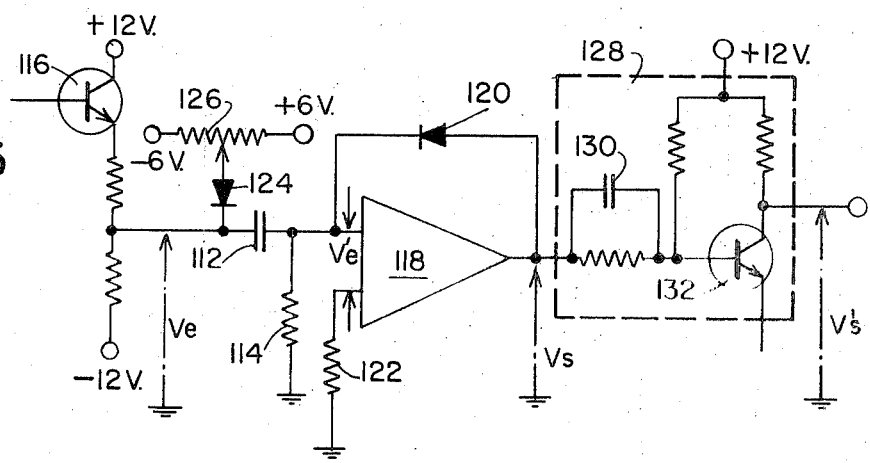
FIG. 5 is a schematic representation of the positive slope detector means according to the invention as incorporated in the device of FIG. 3.

The positive slope detector means 80, which includes a differentiator circuit, may be constructed in accordance with the schematic representation illustrated in FIG. 5 and to which attention is now directed. The output signal of said positive slope detector means 80 is in the form of a rectangular pulse such as illustrated in line 100 of FIG. 4 when the amplitude of the input signal received from amplifier 76 is positive or gaining. The differentiator circuit within detector means 80 comprises a capacitor 112 and a resistance 114 interposed between transistor 116 and the input to operational amplifier 118 having a negative feedback diode 120. The time constant of the R.C. circuit is adjusted so that the sensitivity will be maximum for the type of slopes to be detected. The second input to the operational amplifier 118 is grounded through resistance 122 of the same value as resistance 114.

By designating $V'_e$ as the voltage between the input terminals of the operational amplifier 118 with the R and C the values of resistances 114 and 122 and of capacitor 112 respectively, $$V'_e \# RC\, dV_e/dt.$$

In order for this equation to be valid, $V'_e$ must be negligible in relation to the voltage $V_e$, that is, the input voltage to the positive slope detector circuit and RC time must be small in relation to the pulse duration. (R, however, must not be too small, or the $V'_e$ may be confused with noise).

A diode 124 for blocking the lower amplitude signals below the threshold voltage level is placed between the slide of a potentiometer 126 for the bias adjustment of the slope detector circuit 80. The diode 124 is conductive and biases the emitter of the transistor 116 to block it as long as the low threshold voltage level is above the amplitude of the pulses arriving at the base of transistor 116. In the contrary case, the transistor 116 is unblocked when the amplitude of the pulses above the low threshold voltage level causes diode 124 to be nonconductive and thereby these pulses are transmitted to the input of the positive slope detector circuit 80. Consequently, the apparatus is rendered immune to the brief parasitic noise whose amplitude is below the low threshold voltage.

The output voltage, $V'_e$, of the differentiator circuit, is amplified and detected by the operational amplifier 118 associated with the diode 120 allowing same only to detect positive pulses. Amplifier 118 is followed by a shaping circuit 128 which on the one hand compensates for the limited response speed of the amplifier and on the other hand brings the output signals back to a positive value, between 0 and 12 volts, permitting connection to conventional integrated logic circuits. The shaping circuit 128 shown in FIG. 5 comprises a capacitor 130 controlling the voltage on a transistor 132.

Although the preferred embodiment described herein includes both high and low threshold level detector circuits, mere use of a high threshold level detector alone will suffice for use in cooperation with the positive slope detector means where the samples are relatively pure in nature so as to be free of noise causing debris or extraneous matter or where filter means is utilized to substantially reduce the noise factor.

What is desired to be secured by Letters Patent of the United States is:

I claim:

1. Particle study apparatus of the type including a sensing zone arrangement wherein a train of pulses is generated representative of particles passing through the scanning ambit within said sensing zone, means for enhancing the resolving of pulses of said pulse train which are representative of particles passing through said scanning ambit with a short time interval between passing particles, said resolving means comprising: a pair of threshold level circuits coupled to operate upon the pulses generated by said sensing zone arrangement and to provide an output signal for each pulse having a maximum amplitude lying between predetermined maximum and minimum values, a positive slope detector means connected in parallel with said threshold level circuits to provide an output signal in response to each positive slope of each pulse, and logic circuit means electrically coupled to said threshold circuits and said positive slope detector means to receive said output signals respectively therefrom and responsive to said output signals for generating an output for each positive slope end occurring when the amplitude of each pulse is between said maximum and minimum values.

2. The apparatus as claimed in claim 1 in which the logic circuit means comprises a veto AND gate.

3. The apparatus as claimed in claim 1 in which the logic circuit is connected to a counter circuit, said counter circuit being activated by each output therefrom.

4. The apparatus as claimed in claim 1 in which said positive slope detector means comprises a differentiator circuit.

5. The apparatus as claimed in claim 1 in which said positive slope detector means comprises an RC circuit.

6. The apparatus as claimed in claim 5 in which said RC circuit is connected to an operational amplifier having a negative feedback diode.

7. The apparatus as claimed in claim 6 in which there is provided a shaper circuit and the output of said operational amplifier is connected to the input of said shaper circuit, the output of said shaper circuit being in the form of a signal having a rectangular waveshape.

8. The apparatus as claimed in claim 1 in which at least one of said threshold level circuits is adjustable.

9. The apparatus as claimed in claim 1 in which said threshold level detector circuits are each adjustable.

10. Particle study apparatus of the type including a sensing zone arrangement wherein a train of pulses is generated representative of particles passing through the scanning ambit within said sensing zone, means for enhancing the resolving of pulses of the said pulse train which are representative of particles passing through said scanning ambit with a short time interval between passing particles, said resolving means comprising: threshold level detector means for detecting the amplitude of each pulse in said pulse train and providing a first signal representing each pulse having a maximum amplitude below a certain maximum value, positive slope detector means for providing a second signal representative of the time of the end of each positive slope of each pulse, and logic circuit means connected to said threshold level detector means and said positive slope detector means to receive said first and second signals and to provide a logic output signal on each occasion when the positive slope end occurs during the first signal.

11. The apparatus as claimed in claim 10 in which said positive slope detector means comprises an RC circuit in series with an operational amplifier having negative feedback means.

12. The apparatus as claimed in claim 11 and a shaper circuit connected to the output of said operational amplifier, said shaper circuit providing an output signal in the form of a rectangular wave, said output signal being fed to said logic circuit along with said first signal from said threshold level detector means, whereupon said logic circuit provides an output indicating reception of both said first and second output signals.

13. The apparatus as claimed in claim 12 and a counter circuit connected to said logic circuit and adapted to be activated upon receipt of said logic circuit output signal so as to register each such occurrence.

14. Apparatus according to claim 10 in which said sensing zone includes a Coulter-type scanning aperture.

* * * * *